United States Patent
Miyazawa et al.

(10) Patent No.: US 7,693,016 B2
(45) Date of Patent: Apr. 6, 2010

(54) OPTICAL RECORDING METHOD, OPTICAL RECORDING APPARATUS, ONE-CHIP CPU DEVICE, AND COMPUTER PROGRAM

(75) Inventors: Fuyuki Miyazawa, Gunma (JP); Hiroya Kakimoto, Gunma (JP); Mitsuo Sekiguchi, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 756 days.

(21) Appl. No.: 11/501,601

(22) Filed: Aug. 8, 2006

(65) Prior Publication Data
US 2007/0036052 A1  Feb. 15, 2007

(30) Foreign Application Priority Data
Aug. 9, 2005  (JP) ............... 2005-230533

(51) Int. Cl.
*G11B 19/02* (2006.01)
(52) U.S. Cl. ............... 369/47.53; 369/53.26; 369/94
(58) Field of Classification Search ............... 369/47.5, 369/47.51–47.53, 53.22, 53.27, 53.31
See application file for complete search history.

(56) References Cited

U.S. PATENT DOCUMENTS

| | | | | |
|---|---|---|---|---|
| 7,272,089 | B2 * | 9/2007 | Matsumoto ............... | 369/47.53 |
| 7,369,469 | B2 * | 5/2008 | Watanabe et al. ......... | 369/47.5 |
| 2003/0133378 | A1 * | 7/2003 | Kawashima et al. ..... | 369/47.53 |
| 2005/0018572 | A1 * | 1/2005 | Gushima et al. ......... | 369/53.15 |
| 2005/0226116 | A1 * | 10/2005 | Kubo et al. ............... | 369/47.53 |
| 2005/0265183 | A1 * | 12/2005 | Kakimoto et al. ........ | 369/47.53 |
| 2006/0067190 | A1 * | 3/2006 | Kurobe et al. ............ | 369/47.36 |

FOREIGN PATENT DOCUMENTS

| | | |
|---|---|---|
| JP | 2003-22532 | 1/2003 |
| JP | 2003-178448 | 6/2003 |
| JP | 2004-171740 | 6/2004 |
| JP | 2004-247024 | 9/2004 |
| JP | 2005-100610 | 4/2005 |
| WO | WO 02/29791 | 4/2002 |

OTHER PUBLICATIONS

Machine translation of JP2004-087054A into English, Nakahara.*

* cited by examiner

*Primary Examiner*—Joseph H Feild
*Assistant Examiner*—Brian Butcher
(74) *Attorney, Agent, or Firm*—Law Office of Katsuhiro Arai

(57) ABSTRACT

There are provided an optical recording method, an optical recording apparatus, a one-chip CPU device, and a computer program. Reference data corresponding to a recording condition of a first recording layer, a physical characteristic value correlated with the recording condition, and a physical characteristic value correlated with a recording condition of a second recording layer are extracted from a data table in a memory, and the recording condition of the extracted reference data is set as a recording condition of a recording medium as an information recording target. When no correlated reference data exists, the closest reference data are extracted from the data table, and a recording pulse condition suitable for recording information on the second recording layer of an optical disk as the information recording target is extracted on the basis of the correlation between the recording condition of the reference data and the physical characteristic value.

21 Claims, 15 Drawing Sheets

| MEDIUM IDENTIFICATION INFORMATION | RECORDING LAYER | LASER POWER | STRATEGY DATA TYPE | REFLECTANCE RGa |
|---|---|---|---|---|
| 001-XXX | L0 | 20 | AA | 30 |
| | L1 | 24 | AQ | 25 |
| 002-XXX | L0 | 22 | BB | 20 |
| | L1 | 18 | BI | 25 |
| 003-XXX | L0 | 25 | CD | 18 |
| | L1 | 26 | DD | 18 |
| • | • | • | • | • |
| • | • | • | • | • |
| • | • | • | • | • |

Fig. 2

| MEDIUM IDENTIFICATION INFORMATION | RECORDING LAYER | LASER POWER | STRATEGY DATA TYPE | REFLECTANCE RGa |
|---|---|---|---|---|
| 001-XXX | L0 | 20 | AA | 30 |
|  | L1 | 24 | AQ | 25 |
| 002-XXX | L0 | 22 | BB | 20 |
|  | L1 | 18 | BI | 25 |
| 003-XXX | L0 | 25 | CD | 18 |
|  | L1 | 26 | DD | 18 |
| ⋮ | ⋮ | ⋮ | ⋮ | ⋮ |

Fig. 5

| MEDIUM IDENTIFICATION INFORMATION | RECORDING LAYER | LASER POWER | STRATEGY DATA TYPE | REFLECTANCE RGa |
|---|---|---|---|---|
| XXX-XXX | L0 | | | 20 |
| | L1 | | | 25 |

Fig. 8

| MEDIUM IDENTIFICATION INFORMATION | RECORDING LAYER | LASER POWER | STRATEGY DATA TYPE | REFLECTANCE RGa |
|---|---|---|---|---|
| XXX-XXX | L0 | | | 21 |
| | L1 | | | 26 |

Fig. 10

| MEDIUM IDENTIFICATION INFORMATION | RECORDING LAYER | LASER POWER | STRATEGY DATA TYPE | BEFORE-RECORDING REFLECTANCE RGa | AFTER-RECORDING REFLECTANCE RGb |
|---|---|---|---|---|---|
| 001-XXX | L0 | 20 | AA | 30 | 17 |
|  | L1 | 24 | AQ | 25 | 12 |
| 002-XXX | L0 | 22 | BB | 20 | 16 |
|  | L1 | 18 | BI | 25 | 18 |
| 003-XXX | L0 | 25 | CD | 18 | 13 |
|  | L1 | 26 | DD | 18 | 13 |
| ⋮ | ⋮ | ⋮ | ⋮ | ⋮ | ⋮ |

Fig. 13

| MEDIUM IDENTIFICATION INFORMATION | RECORDING LAYER | LASER POWER | STRATEGY DATA TYPE | BEFORE-RECORDING REFLECTANCE RGa | AFTER-RECORDING REFLECTANCE RGb |
|---|---|---|---|---|---|
| XXX-XXX | L0 | 21.8 | BC | 20 | 16 |
| | L1 | | | 25 | - |

Fig. 15

SINGLE-LAYERED MEDIUM STRATEGY TABLE

| MEDIUM TYPE \ RECORDING SPEED | | | | | →|
|---|---|---|---|---|---|
| | | | | | |
| | | | | | |
| ↓ | | | | | |
| | | | | | |

PRIOR ART

Fig. 16

SINGLE-LAYERED MEDIUM STRATEGY TABLE

| MEDIUM TYPE \ RECORDING SPEED | RECORDING LAYER | | | | | →|
|---|---|---|---|---|---|---|
| | L0 | | | | | |
| | L1 | | | | | |
| | Ln | | | | | |
| | L0 | | | | | |
| ↓ | L1 | | | | | |
| | Ln | | | | | |
| | L0 | | | | | |
| | L1 | | | | | |
| | Ln | | | | | |

PRIOR ART

OPTICAL RECORDING METHOD, OPTICAL RECORDING APPARATUS, ONE-CHIP CPU DEVICE, AND COMPUTER PROGRAM

BACKGROUND OF THE INVENTION

1. Field of the Invention

The present invention relates to recording of information on an optical recording medium having a plurality of recording layers, and more particularly, to an optical recording method, an optical recording apparatus, a micro CPU device, and a computer program, which can save a test time for recording information.

2. Description of the Related Art

As known in the art, in an optical recording apparatus for recording data on an optical recording medium such as a known DVD by the use of a laser beam, when recording data on a predetermined recording medium, a recording condition suitable for the recording medium is generally obtained by performing a test recording operation to a test recording area in the recording medium before actually recording data.

However, with increasing requirement for increase in speed and capacity of the optical recording apparatus, when data are recorded on a multi-layered optical recording medium having a plurality of recording layers, it is necessary to obtain recording pulse conditions corresponding to the recording layers, respectively, due to differences in physical characteristics such as recording sensitivity, light reflectance, and thermal conductivity between the recording mediums.

As a known technology for obtaining the recording pulse conditions, as shown in FIGS. 15 and 16, a method is generally used, in which a data table recording the recording pulse conditions for excellently recording data on the respective recording layers in accordance with conditions such as a recording speed every type of recording mediums is stored in advance in a memory of a recording drive (optical recording apparatus) and the recording pulse conditions corresponding to the types, the recording layers, and the recording speeds of the recording medium are read out and set from the data table at the time of actually recording data on the recording medium, thereby recording the data.

In consideration of individual difference or non-uniformity of the recording drive or dependency of a laser on a temperature, a method of adjusting only a condition of the recording laser power at the time of a test recording operation performed before a data recording operation is also generally used.

However, in the known art, it is not possible to satisfactorily cope with the non-uniformity in characteristics of the recording medium and the optical recording apparatus, which the recording laser power cannot compensate for. In addition, it is not possible to satisfactorily cope with "unknown types of optical recording mediums" such as optical recording mediums not previously memorized in any recording apparatus and optical recording mediums (which partially cope with them in the form of firm-up) come to the market after an optical recording apparatus comes to the market.

Therefore, as a recording method of a multi-layered optical recording medium having a plurality of recording layers, for example, a technology disclosed in Japanese Unexamined Patent Application Publication No. 2003-178448 is known.

In the technology, a strategy design is carried out so as to more rapidly cool an outer recording layer than the innermost recording layer as seen in the direction of an incident beam. In the laser power control, the peak power and the bottom power are varied by the use of the optimum power control (OPC) and are repeated until evaluation parameters (for example, modulation, error rate, and jitter) reach predetermined values. In the pulse width control, the bottom period of time, the cooling period of time, and the like are elongated to enhance the cooling ability, thereby improving recording quality for the innermost and outer recording layers. The following patent documents provide additional background:

Japanese Unexamined Patent Application Publication No. 2003-178448

Japanese Unexamined Patent Application Publication No. 2005-100610

Japanese Unexamined Patent Application Publication No. 2003-22532

Japanese Unexamined Patent Application Publication No. 2004-171740

Japanese Unexamined Patent Application Publication No. 2004-247024

PCT Publication WO2002-029791

However, in the technology disclosed in JP-A 2003-178448, since the test recording operation is performed to the respective recording layers by repeating the peak power and the bottom power in the laser power control and the bottom pulse and the cooling pulse in the pulse width control are repeated until the optimum recording condition, there is a problem that it takes time to obtain the optical recording condition of each recording layer. Since it takes time to adjust the recording condition of each layer, the increase in the number of layers causes elongation of the whole test recording time.

SUMMARY OF THE INVENTION

The present invention contrived to solve the above-mentioned problems and has an advantage that it provides an optical recording method, an optical recording apparatus, a one-chip CPU device, and a computer program, which can save a test time before recording information so as to record information for a short time.

According to an aspect of the invention, there is provided an optical recording method in which when an optical recording apparatus records information by irradiating a laser beam to a recording medium having a plurality of layers including one recording layer and another recording layer, the optical recording apparatus determines a recording condition by recording and reproducing test information with respect to a test area of the one recording layer and records the information on the recording medium by irradiating the laser beam to the recording medium on the basis of the determined recording condition. Here, the optical recording apparatus comprises in advance a data table in which reference data of plural types of recording mediums are accumulated where the reference data are obtained by correlating predetermined physical characteristic values having a correlation with the recording conditions of at least the one recording layer and the another recording layer recording conditions. The optical recording apparatus executes: a reference recording layer testing step of recording and reproducing the test information with respect to the one recording layer; a first recording condition extracting step of extracting the recording condition suitable for recording the information on the one recording layer on the basis of the test result of the reference recording layer testing step; a first characteristic value detecting step of detecting the physical characteristic value of the one recording medium having a correlation with the extracted recording condition; a second characteristic value detecting step of detecting the physical characteristic value of the another recording layer; an extraction step of extracting the reference data, which correspond to the recording condition extracted in the first recording condition extracting step, the physical characteristic value detected in the first characteristic value detecting step, and the physical characteristic value detected in the second characteristic value detecting step, from the data table; and a recording condition determining step of setting the recording condition of the extracted reference data as the recording condition of the recording medium as an information recording target.

According to the optical recording method of the invention, the test information is recorded on and reproduced from the one recording layer, and the recording condition suitable for recording the information on the one recording layer is extracted on the basis of the test result obtained through the recording and reproducing operations. The physical characteristic value of the one recording layer correlated with the extracted recording condition is detected and the physical characteristic value of the another recording layer is detected. The reference data corresponding to the recording condition and the physical characteristic value of the one recording layer and the physical characteristic value of the another recording layer are extracted from the data table, and the recording condition of the extracted reference data is used as the recording condition of the recording medium as the information recording target.

When no corresponding reference data exists, the reference data, which are closest to the recording condition and the physical characteristic value of the one recording layer and the physical characteristic value of the another recording layer, are extracted from the data table and the recording condition suitable for recording the information on the another recording layer of the recording medium as the information recording target is extracted on the basis of the correlation between the recording condition and the physical characteristic value of the extracted reference data.

According to another aspect of the invention, there are provided an optical recording apparatus having units for performing the steps of the optical recording method, a one-chip CPU device used for the optical recording apparatus, and a computer program for driving the CPU device used for the optical recording apparatus to execute the optical recording method.

According to the optical recording method of the invention described above, the reference data corresponding to a recording condition and a physical characteristic value of one recording layer and a physical characteristic value of another recording layer are extracted from the data table and the recording condition of the extracted reference data is used as the recording condition of a recording medium as an information recording target. Accordingly, even as for an unknown type of recording medium or a recording medium having non-uniform characteristics, it is possible to adjust a recording pulse condition of another recording layer for a short time without performing any test recording operation. In addition, even with different recording apparatuses, different recording mediums, and different recording conditions such as a recording speed, it is possible to record information with high quality. It is also possible to further reduce the recording area for the test recording operation in comparison with that in the past.

Even when the reference data corresponding to the recording condition and the physical characteristic value of one recording layer and the physical characteristic value of another recording layer do not exist, the reference data which are closest to the recording condition and the physical characteristic value of the one recording layer and the physical characteristic value of the another recording layer are extracted from the data table and the recording condition suitable for recording the information on the another recording layer of the recording medium as the information recording target is extracted on the basis of the correlation between the recording condition and the physical characteristic value of the extracted reference data. Accordingly, even as for an unknown type of recording medium or a recording medium having non-uniform characteristics, it is possible to adjust a recording pulse condition of the another recording layer for a short time without performing any test recording operation. In addition, even with different recording apparatuses, different recording mediums, and different recording conditions such as a recording speed, it is possible to record information with high quality. It is also possible to further reduce the recording area for the test recording operation in comparison with that in the past.

According to the optical recording apparatus of the invention, it is possible to easily embody the optical recording method.

According to the micro CPU device of the invention, it is possible to easily embody the optical recording method.

According to the computer program of the invention, it is possible to easily embody the optical recording method by the use of a CPU.

BRIEF DESCRIPTION OF THE DRAWINGS

FIG. 2 is a diagram illustrating a data table according to the first embodiment of the invention.

FIG. 5 is a diagram illustrating a detection example of physical characteristic values according to the first embodiment of the invention.

FIG. 8 is a diagram illustrating a detection example of physical characteristic values according to the first embodiment of the invention.

FIG. 10 is a diagram illustrating a data table according to a fourth embodiment of the invention.

FIG. 13 is a diagram illustrating a detection example of physical characteristic values according to the fourth embodiment of the invention.

FIG. 15 is a diagram illustrating a known strategy table.
FIG. 16 is a diagram illustrating a known strategy table.

DESCRIPTION OF PREFERRED EMBODIMENTS

Hereinafter, preferred embodiments of the invention will be described with reference to the drawings.

Figure 1:
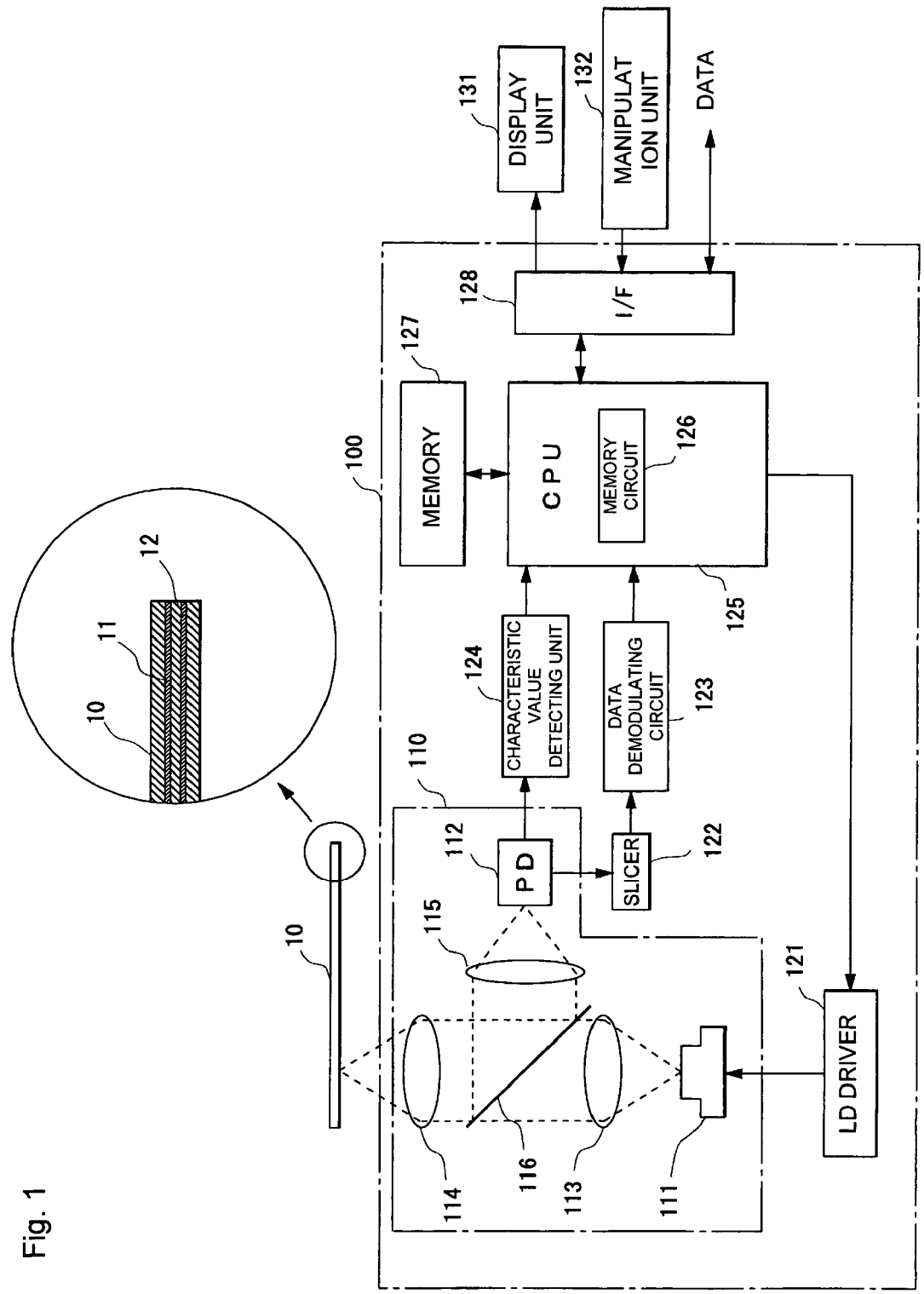
FIG. 1 is a diagram illustrating a configuration of an optical recording apparatus and a configuration of an optical disk according to a first embodiment of the invention.

FIG. 1 is a diagram illustrating a configuration of an optical recording apparatus and a configuration of an optical disk according to a first embodiment of the invention. In the figure, reference numeral 10 denotes an optical disk, which is a multi-layered optical recording medium such as known DVD, HD-DVD, and blue-ray disk and is an optical recording medium having two recording layers of a first recording layer 11 and a second recording layer 12 from the position most away from a layer beam irradiating surface in the first embodiment. In the first embodiment, the optical recording medium having two recording layers is illustrated, but an optical recording apparatus 100 may record and reproduce information using an optical recording medium having three or more recording layers as the optical disk 10.

Reference numeral 100 denotes an optical recording apparatus, which includes an optical pickup 110, a laser diode (hereinafter, referred to as LD) driver 121, a slicer 122, a data demodulating circuit 123, a characteristic value detecting unit 124, a CPU device (hereinafter, referred to as CPU) 125, a memory unit 127, and an interface (hereinafter, referred to as I/F) 128. Here, only a configuration specific to the invention is described.

A display unit 131 such as a personal computer or a display and a manipulation unit 132 such as a keyboard are connected to the optical recording apparatus 100.

The optical pickup 110 includes a laser diode (hereinafter, referred to as LD) 111, a photo detector (hereinafter, referred to as PD) 112, a collimator lens 113, an objective lens 114, a detector lens 115, and a beam splitter 116. A laser beam emitted from the LD 111 is irradiated to the optical disk 10 through the collimator lens 113, the beam splitter 116, and the objective lens 114. The laser beam reflected by the optical disk 10 passes through the objective lens 114, is reflected by the beam splitter 116, and then is incident on the PD 112 through the detector lens 115. The PD 112 outputs current corresponding to the intensity of the incident beam.

The LD driver 121 supplies driving current to the LD 111 on the basis of a recording signal input from the CPU 125, thereby allowing the LD 111 to emit a laser beam.

The slicer 122 slices a current signal output from the PD 112 by the use of a predetermined threshold value, converts the current into a binary voltage signal, and then the binary voltage signal.

The data demodulating circuit 123 is a circuit for demodulating the encoded binary signal output from the slicer 122 and outputting the demodulated binary signal to the CPU 125 and serves to output a digital signal, which is obtained by demodulating a signal EFM-modulated and encoded with pulse widths of binary voltage signals 3T to 11T output from the slicer 122, to the CPU 125.

The characteristic value detecting unit 124 receives the current signal output from the PD 112, detects a physical characteristic value from the reflected beam (return beam) from the optical disk 10 on the basis of the current signal, and outputs the physical characteristic value as digital information to the CPU 125. The physical characteristic value detected from the reflected beam is a physical characteristic value which depends upon, for example, the recording laser power or the recording pulse condition and is suitable for optimizing the recording pulse condition. In the first embodiment, the physical characteristic value includes β asymmetry, phase, amplitude, reflectance, and the like.

The CPU 125 is a well-known CPU device and includes a memory circuit 126 storing a computer program for operating the CPU therein. The CPU 125 controls a driving mechanism unit (not shown) to adjust the position, the tracking, and the focus of the optical pickup 110 and to control the rotation of the optical disk 10, records (writes) externally input data on the optical disk 10 or reads out data recorded on the optical disk 10 on the basis of a data table stored in the memory unit 127, and outputs the read data to an external device. In addition, the CPU 125 performs a test operation at the time of recording data on the optical disk 10 through the processes to be described later and obtains the optimum laser condition, thereby allowing data to be recorded on the optical disk.

The memory unit 127 is connected to the CPU 125 and stores a data table including a plurality of reference data shown in FIG. 2 and strategy data (not shown) corresponding to strategy data types described in the data table. Data such as laser power, strategy data type, and before-recording reflectance RGa are stored in the data table to correspond to the recording layers in the unit of medium identification information. In the data table shown in FIG. 2, as data of a medium of which the medium identification information is "001-XXX", data with a laser power of "20", a strategy data type of "AA", and reflectance RGa of "30" are recorded for a first recording layer L0 and data with a laser power of "24", a strategy data type of "AQ", and reflectance RGa of "25" are recorded for a second recording layer L1. As data of a medium of which the medium identification information is "002-XXX", data with a laser power of "22", a strategy data type of "BB", and reflectance RGa of "20" are recorded for a first recording layer L0 and data with a laser power of "18", a strategy data type of "BI", and reflectance RGa of "25" are recorded for a second recording layer L1. As data of a medium of which the medium identification information is "003-XXX", data with a laser power of "25", a strategy data type of "CD", and reflectance RGa of "18" are recorded for a first recording layer L1 and data with a laser power of "26", a strategy data type of "DD", and reflectance RGa of "18" are recorded for a second recording layer L1.

The I/F 128 is an interface for connecting the CPU to the display unit 131 and the manipulation unit 132 and serves to transmit recording and reproducing data between an external device and the CPU 125.

In the above-mentioned configuration, information is recorded on and reproduced from the optical disk 10 by the use of a laser beam output from the LD 111, thereby transmitting and receiving data to and from an external apparatus such as a personal computer (PC). The optical recording apparatus 100 records information in the order of the first recording layer 11 and the second recording layer 12 when of recording data on the optical disk 10.

When recording data on the optical disk 10, a strategy as a recording condition of the optical disk 10 is determined by encoding the recording data and processing the encoded recording data by the use of the CPU 125, the strategy is converted into a recording pulse by the use of the LD driver 121, and a laser beam, which is converted into a pulse on the basis of the recording pulse, is emitted from the LD 111.

The LD driver 121 drives the LD 111 on the basis of the input recording pulse, and the LD 111 controls the output laser beam on the basis of the recording pulse and irradiates the controlled laser beam to the optical disk 10, which rotates at a constant linear speed or at a constant angular speed, through the collimator lens 113, the beam splitter 116, and the objective lens 114. Consequently, a recording pattern having pit and space lines corresponding to desired recording data is recorded on the optical disk 10.

In order to record data on the optical disk 10, data are first recorded in and reproduced from a test area of the optical disk 10 as known well, thereby determining the optimum condition for irradiating a laser beam. In the optical recording apparatus 100 according to the first embodiment, it is possible to further reduce the test time for determining the optimum condition for irradiating a laser beam in comparison with that in the past.

Hereinafter, a method of determining the laser beam irradiating condition according to the first embodiment will be described in detail.

Figure 3:
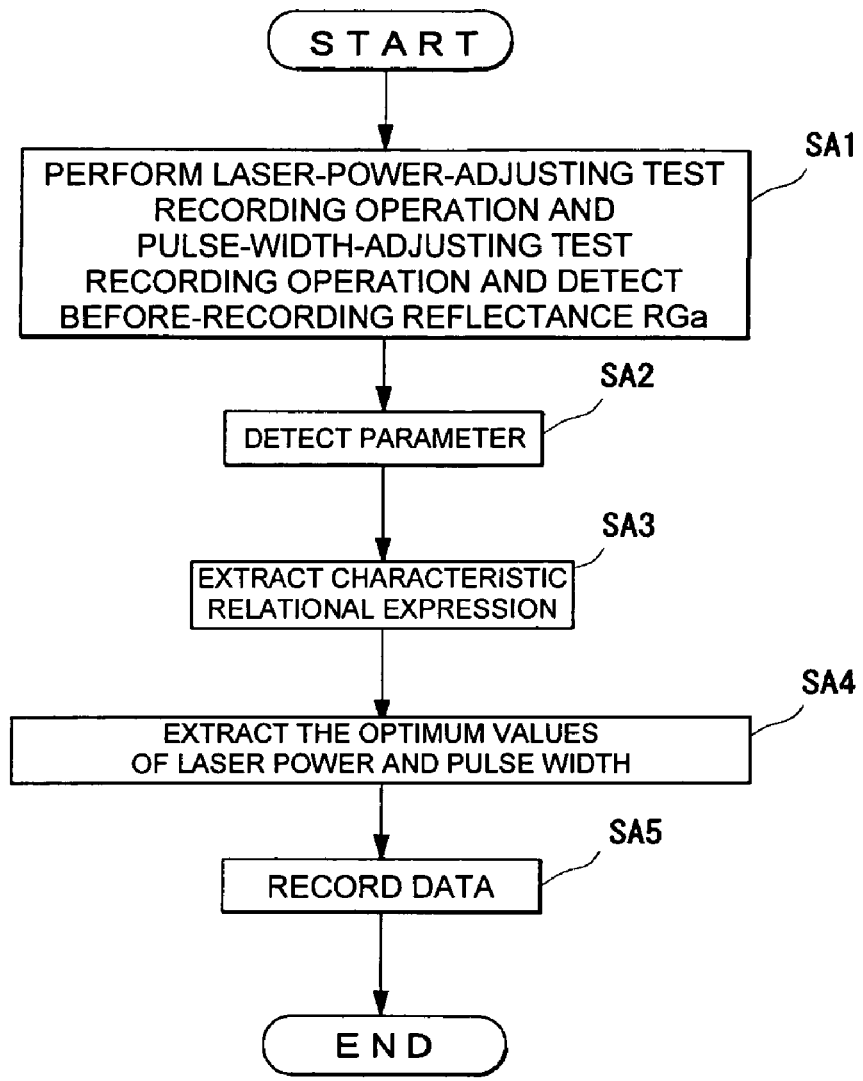
FIG. 3 is a flowchart illustrating a recording process to a first recording layer according to the first embodiment of the invention.
Figure 4:
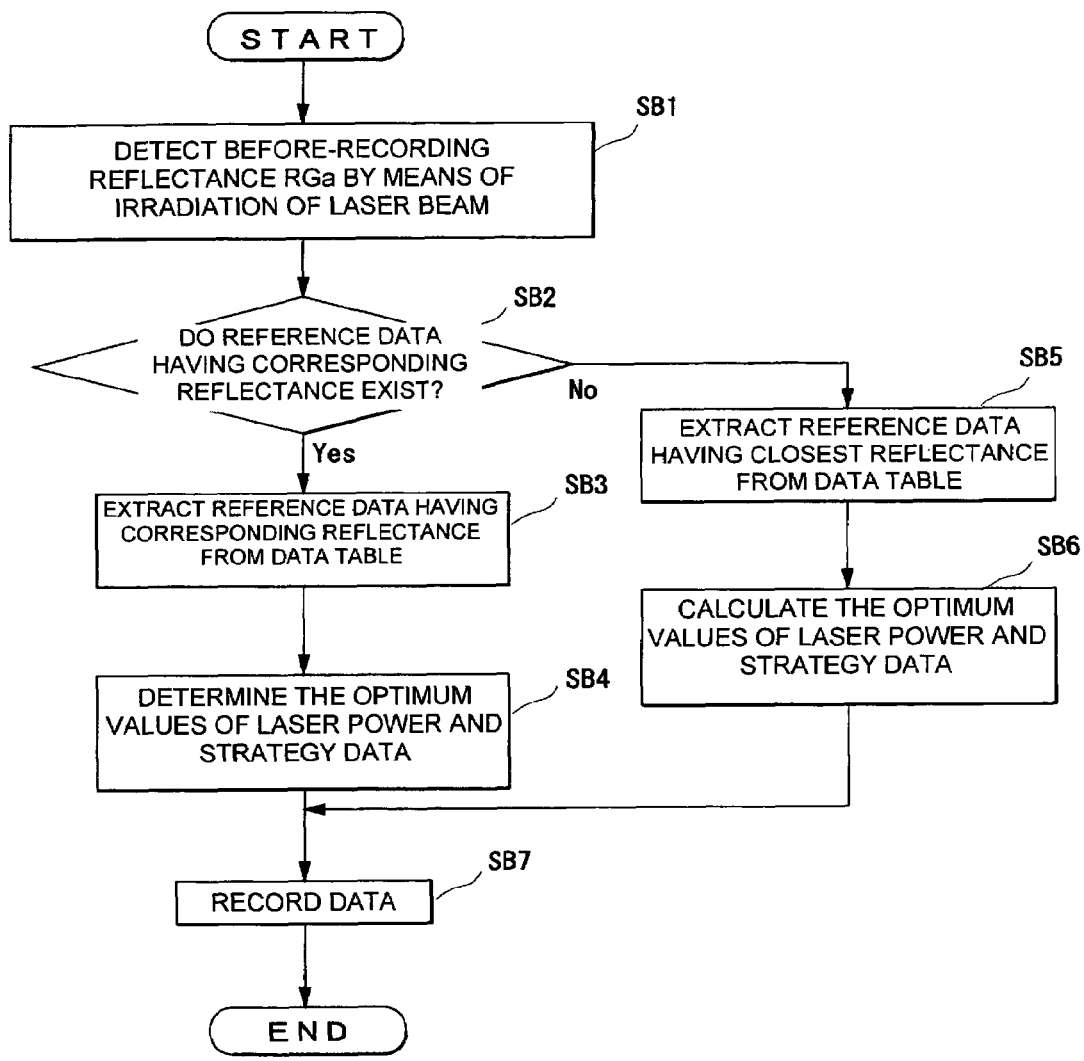
FIG. 4 is a flowchart illustrating a recording process to a second recording layer according to the first embodiment of the invention.

FIGS. 3 and 4 are flowcharts illustrating a recording process to a recording layer according to the first embodiment. A computer program for performing the process is stored in advance in the memory circuit 126 of the CPU 125 and the process is performed by the CPU 125. In the first embodiment, an operation of detecting reflectance as a physical characteristic value of the recording layer is performed in the test process at the time of recording data on the first recording layer 11 of the optical disk 10. In the test process at the time of recording data on a recording layer other than the first recording layer 11, it is possible to save the test time, unlike the test process for the first recording layer 11.

That is, in order to record data on the first recording layer 11, the process shown in FIG. 3 is performed. At the initial time, by performing predetermined times a test operation including a laser-power-adjusting test recording operation and a pulse-width-adjusting test recording operation with an adjusting data pattern by the use of the same optimum power control (hereinafter, referred to as OPC) of a recording laser beam as the past, recorded data are reproduced and by irradiating the reproducing-power laser beam, the before-recording reflectance RGa is detected (SA1). Thereafter, a parameter of the laser beam irradiating condition is detected (SA2). In case of DVD, examples of the parameter can include β (asymmetry), a laser beam irradiating power, and a pulse phase. The laser-power-adjusting test recording operation is performed while gradually varying the laser power, and the pulse-width-adjusting test recording operation is performed while gradually varying the pulse width. When the data of the strategy table stored in the memory unit 127 can be used at the time of detecting the parameter, the data are used, and when the optical disk 10 is an unknown type of optical disk for which the data of the strategy table stored in the memory 127 cannot be used, a well-known automatic strategy detecting operation is performed.

Subsequently, a characteristic relational expression is derived from the detected parameter (SA3). Examples of the characteristic relational expression can include a characteristic relational expression indicating a relation between the laser power and β, a characteristic relational expression indicating a phase correcting parameter in a relation between the laser power and the pulse phase, that is, between a positional shift of the rising and falling of a pulse and a phase, and a characteristic relational expression indicating a pulse phase correcting parameter in a relation with the positional shift of the rising and falling of a pulse. Here, two kinds of parameters, that is, the characteristic relational expression indicating the relation between the laser power and β and the characteristic relational expression indicating the phase correcting parameter in a relation between the laser power and the pulse phase, that is, between a positional shift of the rising and falling of a pulse and a phase, are extracted from the test data recorded while gradually varying the laser power.

Thereafter, the optimum recording pulse conditions of the laser power and the pulse width are extracted using the parameters obtained from the characteristic relational expressions (SA4), and data are actually recorded on the first recording layer 11 by the use of the optimum recording pulse conditions (SA5).

When data are recorded on a recording layer, that is, the second recording layer 12, other than the first recording layer 11, the reproducing-power laser beam is first irradiated to detect the before-recording reflectance RGa (SB1). Then, it is determined whether a recording medium having reflectance RGa corresponding to the detected reflectance RGa is stored in the data table of the memory unit 127 (SB2). When it is determined in SB2 that the recording medium having the corresponding reflectance RGa is stored in the data table of the memory unit 127, the reference data of the recording medium having the corresponding reflectance RGa are extracted from the data table (SB3), the laser power and the strategy data type of the reference data are determined as the optimum recording pulse conditions (optimum values) of the recording medium as a recording target (SB4), and then data are recorded on the second recording layer 12 by the use of the optimum recording pulse conditions (SB7).

When it is determined in SB2 that the recording medium having the corresponding reflectance RGa is not stored in the data table of the memory unit 127, the reference data of the recording medium having reflectance RGa closest to the detected reflectance are extracted from the data table (SB5), the laser power and the strategy data type of the reference data are subjected to a predetermined operation to calculate the optimum recording pulse conditions (optimum values) of the recording medium as a recording target (SB6), and then data are recorded on the second recording layer 12 by the use of the optimum recording pulse conditions (SB7).

For example, as shown in FIG. 5, when "20" is detected as the reflectance RGa of the first recording layer 11 and "25" is detected as the reflectance of the second recording layer 12, the reference data having the medium identification information of "002-XXX" are extracted as the corresponding reference data from the data table, and data are recorded on the second recording layer 12 by the use of strategy data with the laser power of "18" and the strategy data type of "BI" described in the reference data.

In the first embodiment, by using the ratio of the reflectance RGa1 of the first recording layer 11 and the reflectance RGa2 of the second recording layer 12 for calculating the optimum recording pulse condition, the laser power and the strategy data type of the second recording layer 12 are obtained with reference to the laser power and the strategy data type of the first recording layer 11.

According to the first embodiment described above, the reference data corresponding to the laser power and the strategy data type as the recording conditions and the reflectance RGa as the physical characteristic value of the first recording layer 11 and the reflectance RGa of the second recording layer 12 are extracted from the data table, and the recording conditions of the extracted reference data are used as the optimum recording pulse conditions (recording conditions) of the recording medium as the information recording target. Accordingly, even as for an unknown type of recording medium or a recording medium having non-uniform characteristics, it is possible to adjust the optimum recording pulse conditions of the second recording layer 12 for a short time without performing any test recording operation. In addition, even with different recording apparatuses, different recording mediums, and different recording conditions such as a recording speed, it is possible to record information with high quality.

When the reference data corresponding to the laser power and the strategy data type as the recording conditions and the reflectance RGa as the physical characteristic value of the first recording layer 11 and the reflectance RGa of the second recording layer 12 do not exist, the reference data closest to the laser power and the strategy data type as the recording conditions and the reflectance RGa as the physical characteristic value of the first recording layer 11 and the reflectance RGa of the second recording layer 12 are extracted from the data table, and the optimum recording pulse conditions suitable for recording information on the second recording layer 12 of the recording medium as the information recording target are extracted on the basis of the correlation between the recording conditions and the reflectance RGa of the extracted reference data. Accordingly, even as for an unknown type of recording medium or a recording medium having non-uniform characteristics, it is possible to adjust the optimum recording pulse conditions of the second recording layer 12 for a short time without performing any test recording operation. In addition, even with different recording apparatuses, different recording mediums, and different recording conditions such as a recording speed, it is possible to record information with high quality.

According to the first embodiment, the optical recording apparatus 100 can easily embody the optical recording method. In addition, the micro CPU device 125 according to the first embodiment can easily embody the optical recording method. In addition, the computer program according to the first embodiment can easily embody the optical recording apparatus 100 and the optical recording method by the use of any CPU.

In the above-mentioned embodiment, a well-known multi-layered DVD has been used as the optical disk 10. However, even when an HD-DVD is used as the optical disk 10, the same advantages can be obtained through the same processes. When a well-known blue-ray disk is used as the optical disk 10, the blue-ray disk is different in specifications from the DVD and thus the optimum recording pulse conditions of the first recording layer 11 can be obtained by extracting a characteristic relational expression indicating a relation between the laser power and the asymmetry, a characteristic relational expression indicating a phase correcting parameter in a relation between the laser power and the amplitude, and a characteristic relational expression indicating a pulse phase correcting parameter in a relation between the positional shift of the rising and falling of a pulse and the phase with respect to the first recording layer 11.

A second embodiment of the invention will be described.

The configuration of the second embodiment is basically similar to that of the first embodiment, but is different from that of the first embodiment, in that a CPU 125 storing a computer program including a different recording process is used in the second embodiment. In the following description, the same elements as the first embodiment are denoted by the same reference numerals.

Figure 6:
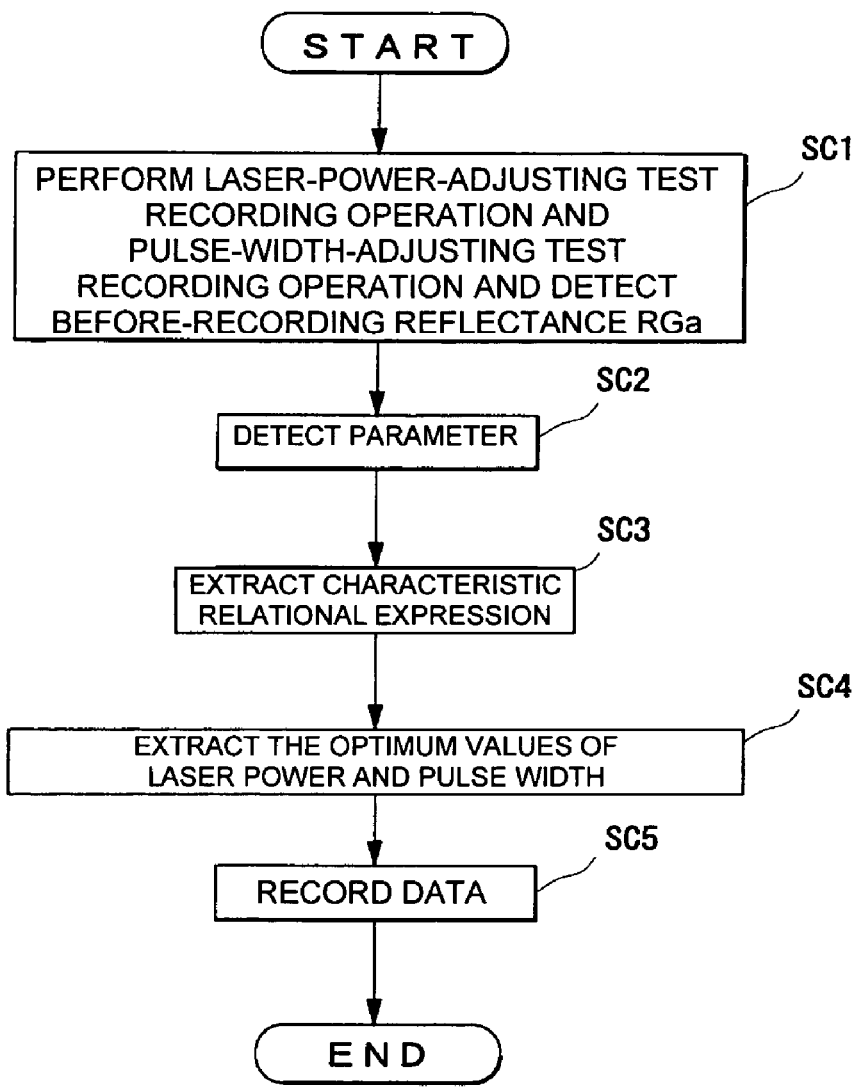
FIG. 6 is a flowchart illustrating a recording process to a first recording layer according to a second embodiment of the invention.
Figure 7:
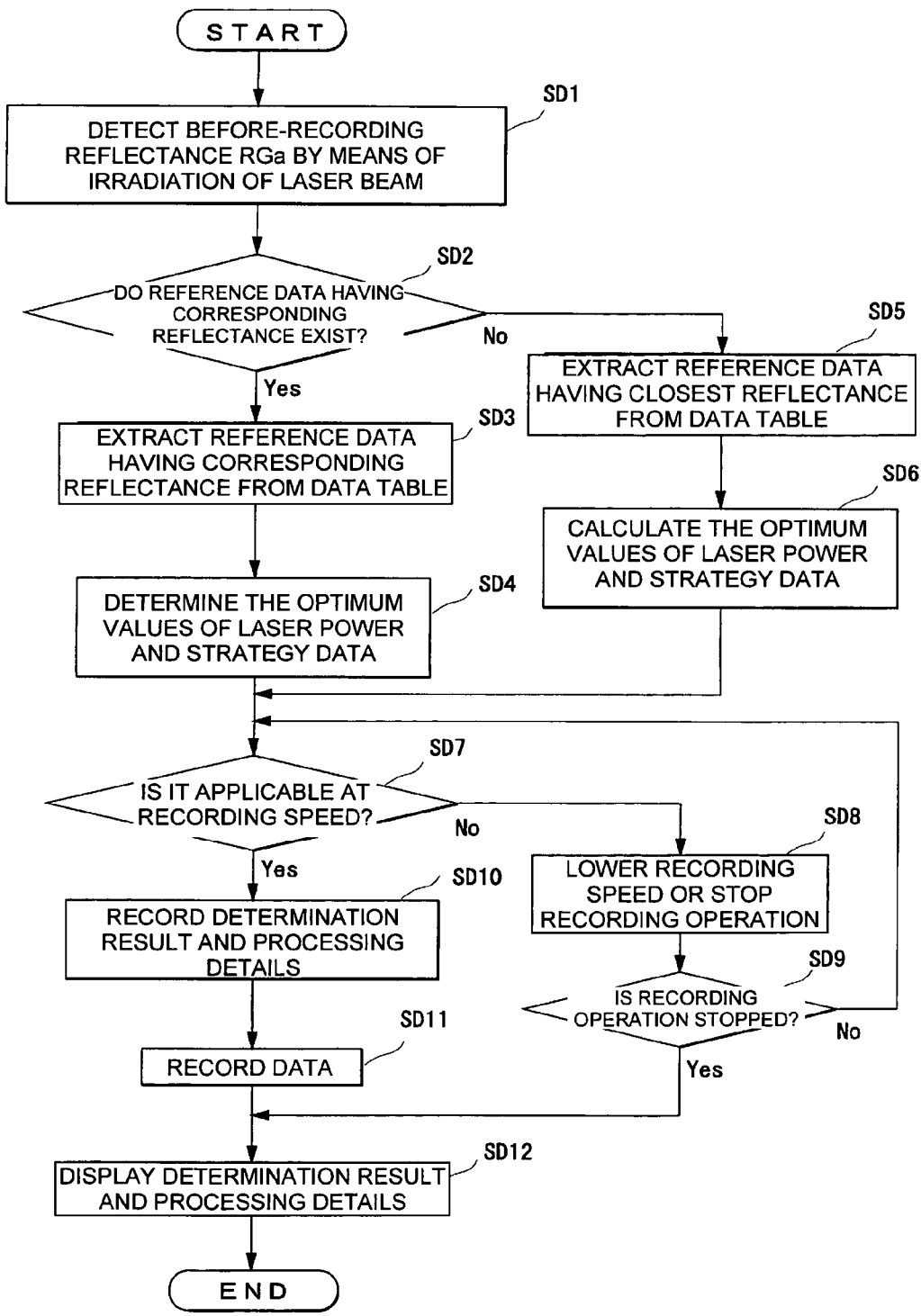
FIG. 7 is a flowchart illustrating a recording process to a second recording layer according to the second embodiment of the invention.

FIGS. 6 and 7 are flowcharts illustrating a recording process to a recording layer according to the second embodiment. A computer program for performing the process is stored in advance in the memory circuit 126 of the CPU 125 and the process is performed by the CPU 125.

In the second embodiment, in order to record data on the first recording layer 11, as shown in FIG. 6, by performing predetermined times a test operation including a laser-power-adjusting test recording operation and a pulse-width-adjusting test recording operation by the use of the OPC using an adjusting data pattern, recorded data are reproduced and by irradiating the reproducing-power laser beam, the before-recording reflectance RGa is detected (SC1). Thereafter, a parameter of the laser beam irradiating condition is detected (SC2). In case of DVD, examples of the parameter can include β (asymmetry), a laser beam irradiating power, and a pulse phase. The laser-power-adjusting test recording operation is performed while gradually varying the laser power, and the pulse-width-adjusting test recording operation is performed while gradually varying the pulse width. When the data of the strategy table stored in the memory unit 127 can be used at the time of detecting the parameter, the data are used, and when the optical disk 10 is an unknown type of optical disk for which the data of the strategy table stored in the memory 127 cannot be used, a well-known automatic strategy detecting operation is performed.

Subsequently, a characteristic relational expression is derived from the detected parameter (SC3). Examples of the characteristic relational expression can include a characteristic relational expression indicating a relation between the laser power and β, a characteristic relational expression indicating a phase correcting parameter in a relation between the laser power and the pulse phase, that is, between a positional shift of the rising and falling of a pulse and a phase, and a characteristic relational expression indicating a pulse phase correcting parameter in a relation with the positional shift of the rising and falling of a pulse. Here, two kinds of parameters, that is, the characteristic relational expression indicating the relation between the laser power and β and the characteristic relational expression indicating the phase correcting parameter in a relation between the laser power and the pulse phase, that is, between a positional shift of the rising and falling of a pulse and a phase, are extracted from the test data recorded while gradually varying the laser power.

Thereafter, the optimum recording pulse conditions of the laser power and the pulse width are extracted using the parameters obtained from the characteristic relational expressions (SC4), and data are actually recorded on the first recording layer 11 by the use of the optimum recording pulse conditions (SC5).

When data are recorded on a recording layer, that is, the second recording layer 12, other than the first recording layer 11, as shown in FIG. 7, the reproducing-power laser beam is first irradiated to detect the before-recording reflectance RGa (SD1). Then, it is determined whether a recording medium having reflectance RGa corresponding to the detected reflectance RGa is stored in the data table of the memory unit 127 (SD2). When it is determined in SB2 that the recording medium having the corresponding reflectance RGa is stored in the data table of the memory unit 127, the reference data of the recording medium having the corresponding reflectance RGa are extracted from the data table (SD3), the laser power and the strategy data type of the reference data are determined as the optimum recording pulse conditions (optimum values) of the recording medium as a recording target (SD4), and then the process of SD7 to be described later is performed.

When it is determined in SD2 that the recording medium having the corresponding reflectance RGa is not stored in the data table of the memory unit 127, the reference data of the recording medium having reflectance RGa closest to the detected reflectance are extracted from the data table (SD5), the laser power and the strategy data type of the reference data are subjected to a predetermined operation to calculate the optimum recording pulse conditions (optimum values) of the recording medium as a recording target (SD6).

For example, as shown in FIG. 8, when "21" is detected as the reflectance RGa of the first recording layer 11 and "26" is detected as the reflectance of the second recording layer 12, the reference data having the medium identification information of "002-XXX" are extracted as the closest reference data from the data table, and the strategy data with the laser power of "18" and the strategy data type of "BI" described in the reference data are subjected to a predetermined operation, thereby calculating the optimum recording pulse conditions of the recording medium as the recording target.

Thereafter, the test operation including the laser-power-adjusting test recording operation is performed predetermined times at a predetermined recording speed to the test area of the second recording layer 12 by the OPC with an adjusting data pattern on the basis of the optimum recording pulse conditions obtained in the process of SD4 or SD6, there reproducing the recorded data, and then it is determined whether the optimum recording pulse conditions can be applied at a desired recording speed (SD7).

When it is determined in SD7 that the optimum recording pulse conditions can be applied, the process of SD10 to be described later is performed. When it is determined that the optimum recording pulse conditions cannot be applied, a predetermined recording speed obtained by lowering the recording speed is set or the recording operation is stopped (SD8) and then it is determined whether the recording operation is stopped (SD9). When it is determined that the recording operation is stopped, the process of SD12 to be described later is performed and when the recording speed is set lower, the process of SD7 is performed.

When it is determined in SD7 that the optimum recording pulse conditions can be applied at the desired recording speed, the determination result and the processing details are recorded on the optical disk 10 and are recorded in the memory unit 127 to have a correlation with the medium identification information of the optical disk 10 (SD10).

Then, data are recorded on the optical disk 10 by the use of the optimum recording pulse conditions (SD11). Subsequently, the determination result and the processing details are displayed on the display unit 131 (SD13) and then the data recording process to the second recording layer 12 is ended.

According to the second embodiment described above, the reference data corresponding to the laser power and the strategy data type as the recording conditions and the reflectance RGa as the physical characteristic value of the first recording layer 11 and the reflectance RGa of the second recording layer 12 are extracted from the data table, and the recording conditions of the extracted reference data are used as the optimum recording pulse conditions (recording conditions) of the recording medium as the information recording target. Accordingly, even as for an unknown type of recording medium or a recording medium having non-uniform characteristics, it is possible to adjust the optimum recording pulse conditions of the second recording layer 12 for a short time without performing any test recording operation. In addition, even with different recording apparatuses, different recording mediums, and different recording conditions such as a recording speed, it is possible to record information with high quality.

When the reference data corresponding to the laser power and the strategy data type as the recording conditions and the reflectance RGa as the physical characteristic value of the first recording layer 11 and the reflectance RGa of the second recording layer 12 do not exist, the reference data closest to the laser power and the strategy data type as the recording conditions and the reflectance RGa as the physical characteristic value of the first recording layer 11 and the reflectance RGa of the second recording layer 12 are extracted from the data table, and the optimum recording pulse conditions suitable for recording information on the second recording layer 12 of the recording medium as the information recording target are extracted on the basis of the correlation between the recording conditions and the reflectance RGa of the extracted reference data. Accordingly, even as for an unknown type of recording medium or a recording medium having non-uniform characteristics, it is possible to adjust the optimum recording pulse conditions of the second recording layer 12 for a short time without performing any test recording operation. In addition, even with different recording apparatuses, different recording mediums, and different recording conditions such as a recording speed, it is possible to record data with high quality.

According to the second embodiment, the optical recording apparatus 100 can easily embody the optical recording method. In addition, the micro CPU device 125 according to the second embodiment can easily embody the optical recording method. In addition, the computer program according to the second embodiment can easily embody the optical recording apparatus 100 and the optical recording method by the use of any CPU.

In the above-mentioned embodiment, a well-known multi-layered DVD has been used as the optical disk 10. However, even when an HD-DVD is used as the optical disk 10, the same advantages can be obtained through the same processes. When a well-known blue-ray disk is used as the optical disk 10, the optimum recording pulse conditions can be obtained by modifying the processes as described above.

A third embodiment of the invention will be described.

The configuration of the third embodiment is basically similar to that of the first embodiment. The recording process to the first recording layer 11 in the third embodiment is similar to that of the second embodiment, but the third embodiment is different from the second embodiment, in that when the optimum values cannot be applied in spite of lowering the recording speed, the OPC operation and the operations subsequent thereto are repeated instead of stopping the recording operation and a CPU 125 storing a computer program including a different recording process is used in the third embodiment. In the following description, the same elements as the first embodiment and the second embodiment are denoted by the same reference numerals.

Figure 9:
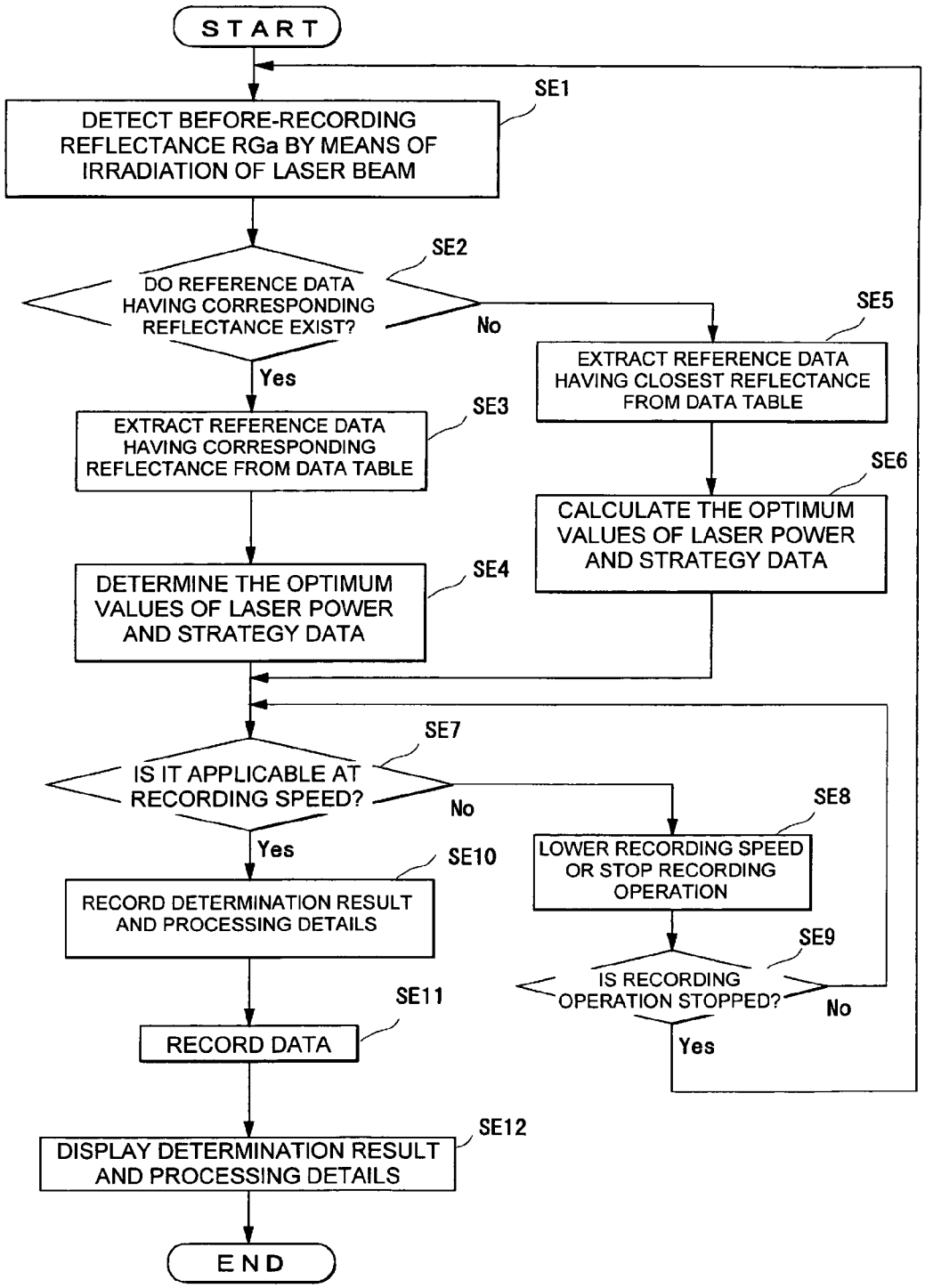
FIG. 9 is a flowchart illustrating a recording process to a second recording layer according to a third embodiment of the invention.

FIG. 9 is a flowchart illustrating a recording process to the second recording layer 12 according to the third embodiment. A computer program for performing the process is stored in advance in the memory circuit 126 of the CPU 125 and the process is performed by the CPU 125.

In order to record data on the second recording layer 12, the reproducing-power laser beam is first irradiated to detect the before-recording reflectance RGa (SE1). Then, it is determined whether a recording medium having reflectance RGa corresponding to the detected reflectance RGa is stored in the data table of the memory unit 127 (SE2). When it is determined in SB2 that the recording medium having the corresponding reflectance RGa is stored in the data table of the memory unit 127, the reference data of the recording medium having the corresponding reflectance RGa are extracted from the data table (SE3), the laser power and the strategy data type of the reference data are determined as the optimum recording pulse conditions (optimum values) of the recording medium as a recording target (SE4), and then the process of SE7 to be described later is performed.

When it is determined in SE2 that the recording medium having the corresponding reflectance RGa is not stored in the data table of the memory unit 127, the reference data of the recording medium having reflectance RGa closest to the detected reflectance are extracted from the data table (SE5), the laser power and the strategy data type of the reference data are subjected to a predetermined operation to calculate the optimum recording pulse conditions (optimum values) of the recording medium as a recording target (SE6).

Thereafter, the test operation including the laser-power-adjusting test recording operation is performed predetermined times at a predetermined recording speed to the test area of the second recording layer 12 by the OPC with an adjusting data pattern on the basis of the optimum recording pulse conditions obtained in the process of SE4 or SE6, thereby reproducing the recorded data, and then it is determined whether the optical recording pulse conditions can be applied at a desired recording speed (SE7).

When it is determined in SE7 that the optimum recording pulse conditions can be applied, the process of SE10 to be described later is performed. When it is determined that the optimum recording pulse conditions cannot be applied, a predetermined recording speed obtained by lowering the recording speed is set or the recording operation is stopped (SE8) and then it is determined whether the recording operation is stopped (SE9). When it is determined that the recording operation is stopped, the process of SE1 is performed and when the recording speed is set lower, the process of SE7 is performed.

When it is determined in SE7 that the optimum recording pulse conditions can be applied at the desired recording speed, the determination result and the processing details are recorded on the optical disk 10 and are recorded in the memory unit 127 to have a correlation with the medium identification information of the optical disk 10 (SE10).

Then, data are recorded on the optical disk 10 by the use of the optimum recording pulse conditions (SE11). Subsequently, the determination result and the processing details are displayed on the display unit 131 (SE13) and then the data recording process to the second recording layer 12 is ended.

According to the third embodiment described above, the reference data corresponding to the laser power and the strategy data type as the recording conditions and the reflectance RGa as the physical characteristic value of the first recording layer 11 and the reflectance RGa of the second recording layer 12 are extracted from the data table, and the recording conditions of the extracted reference data are used as the optimum recording pulse conditions (recording conditions) of the recording medium as the information recording target. Accordingly, even as for an unknown type of recording medium or a recording medium having non-uniform characteristics, it is possible to adjust the optimum recording pulse conditions of the second recording layer 12 for a short time without performing any test recording operation. In addition, even with different recording apparatuses, different recording mediums, and different recording conditions such as a recording speed, it is possible to record information with high quality.

When the reference data corresponding to the laser power and the strategy data type as the recording conditions and the reflectance RGa as the physical characteristic value of the first recording layer 11 and the reflectance RGa of the second recording layer 12 do not exist, the reference data closest to the laser power and the strategy data type as the recording conditions and the reflectance RGa as the physical characteristic value of the first recording layer 11 and the reflectance RGa of the second recording layer 12 are extracted from the data table, and the optimum recording pulse conditions suitable for recording information on the second recording layer 12 of the recording medium as the information recording target are extracted on the basis of the correlation between the recording conditions and the reflectance RGa of the extracted reference data. Accordingly, even as for an unknown type of recording medium or a recording medium having non-uniform characteristics, it is possible to adjust the optimum recording pulse conditions of the second recording layer 12 for a short time without performing any test recording operation. In addition, even with different recording apparatuses, different recording mediums, and different recording conditions such as a recording speed, it is possible to record data with high quality.

According to the third embodiment, the optical recording apparatus 100 can easily embody the optical recording method. In addition, the micro CPU device 125 according to the third embodiment can easily embody the optical recording method. In addition, the computer program according to the third embodiment can easily embody the optical recording apparatus 100 and the optical recording method by the use of any CPU.

In the above-mentioned embodiment, a well-known multi-layered DVD has been used as the optical disk 10. However, even when an HD-DVD is used as the optical disk 10, the same advantages can be obtained through the same processes. When a well-known blue-ray disk is used as the optical disk 10, the optimum recording pulse conditions can be obtained by modifying the processes as described above.

A fourth embodiment of the invention will be described.

The configuration of the fourth embodiment is similar to that of the first embodiment, but is different from that of the first embodiment in that a data table shown in FIG. 10 is stored in the memory unit 127. In the data table, an after-recording reflectance RGb is added to the reference data in the data table shown in FIG. 2. That is, data such as laser power, strategy data type, before-recording reflectance RGa, and after-recording reflectance RGb are stored in the data table to correspond to the recording layers in the unit of medium identification information. In the data table shown in FIG. 10, as data of a medium of which the medium identification information is "001-XXX", data with a laser power of "20", a strategy data type of "AA", reflectance RGa of "30", and reflectance RGb of "17" are recorded for a first recording layer L1 and data with a laser power of "24", a strategy data type of "AQ", reflectance RGa of "25", and reflectance RGb of "12" are recorded for a second recording layer L1. As data of a medium of which the medium identification information is "002-XXX", data with a laser power of "22", a strategy data type of "BB", reflectance RGa of "20", and reflectance RGb of "16" are recorded for a first recording layer L1 and data with a laser power of "18", a strategy data type of "BI", reflectance RGa of "25", and reflectance RGb of "18" are recorded for a second recording layer L1. As data of a medium of which the medium identification information is "003-XXX", data with a laser power of "25", a strategy data type of "CD", reflectance RGa of "18", and reflectance RGb of "13" are recorded for a first recording layer L1 and data with a laser power of "26", a strategy data type of "DD", reflectance RGa of "18", and reflectance RGb of "13" are recorded for a second recording layer L1.

A difference between the fourth embodiment and the first embodiment is that a CPU 125 storing a computer program including a different recording process is used in the fourth embodiment. In the following description, the same elements as the first embodiment are denoted by the same reference numerals.

Figure 11:
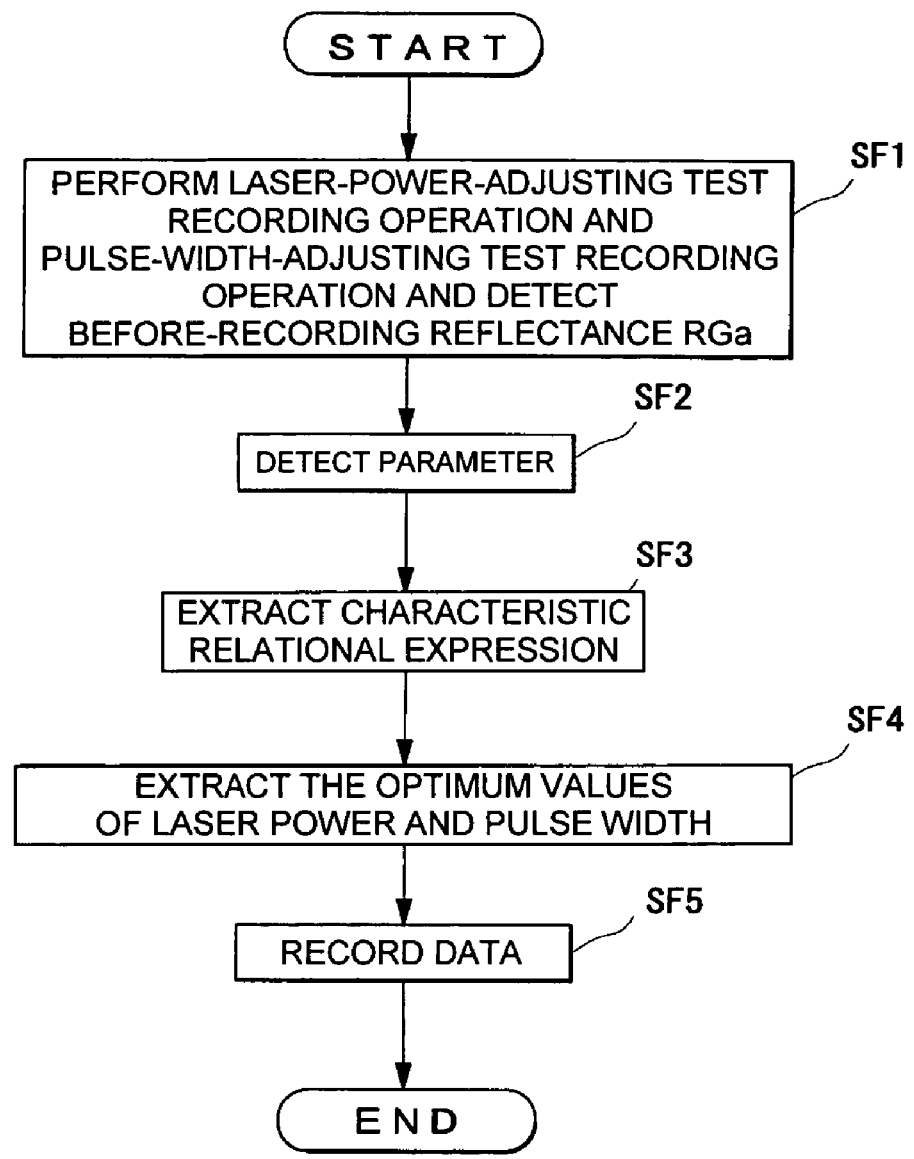
FIG. 11 is a flowchart illustrating a recording process to a first recording layer according to the fourth embodiment of the invention.
Figure 12:
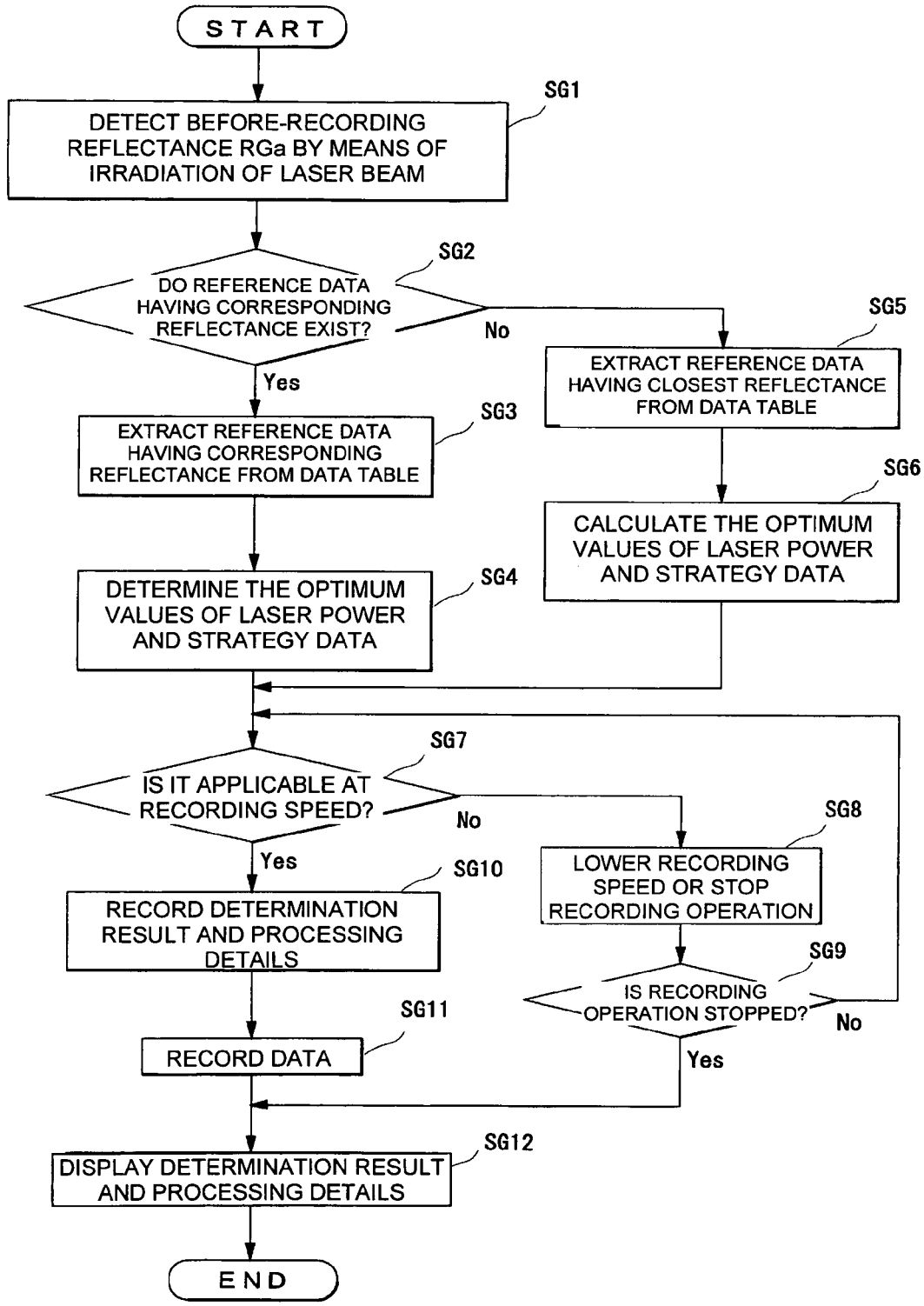
FIG. 12 is a flowchart illustrating a recording process to a second recording layer according to the fourth embodiment of the invention.

FIGS. 11 and 12 are flowcharts illustrating a recording process to a recording layer according to the fourth embodiment. A computer program for performing the process is stored in advance in the memory circuit 126 of the CPU 125 and the process is performed by the CPU 125. In the fourth embodiment, the test process at the time of recording data on the first recording layer of the optical disk 10 is almost similar to that in the past, but a process of detecting reflectance as the physical characteristic value of the recording layer is added. In the test process at the time of recording data on a recording layer other than the first recording layer 11, it is possible to save the test time, unlike the test process to the first recording layer 11.

In the fourth embodiment, in order to record data on the first recording layer 11, as shown in FIG. 11, by performing predetermined times a test operation including a laser-power-adjusting test recording operation and a pulse-width-adjusting test recording operation by the use of the OPC using an adjusting data pattern, recorded data are reproduced and by irradiating the reproducing-power laser beam, the before-recording reflectance RGa and the after-recording reflectance RGb are detected (SF1). Thereafter, a parameter of the laser beam irradiating condition is detected (SF2). In case of DVD, examples of the parameter can include β (asymmetry), a laser beam irradiating power, and a pulse phase. The laser-power-adjusting test recording operation is performed while gradually varying the laser power, and the pulse-width-adjusting test recording operation is performed while gradually varying the pulse width. When the data of the strategy table stored in the memory unit 127 can be used at the time of detecting the parameter, the data are used, and when the optical disk 10 is an unknown type of optical disk for which the data of the strategy table stored in the memory 127 cannot be used, a well-known automatic strategy detecting operation is performed.

Subsequently, a characteristic relational expression is derived from the detected parameter (SF3). Examples of the characteristic relational expression can include a characteristic relational expression indicating a relation between the laser power and β, a characteristic relational expression indicating a phase correcting parameter in a relation between the laser power and the pulse phase, that is, between a positional shift of the rising and falling of a pulse and a phase, and a characteristic relational expression indicating a pulse phase correcting parameter in a relation with the positional shift of the rising and falling of a pulse. Here, two kinds of parameters, that is, the characteristic relational expression indicating the relation between the laser power and β and the characteristic, relational expression indicating the phase correcting parameter in a relation between the laser power and the pulse phase, that is, between a positional shift of the rising and falling of a pulse and a phase, are extracted from the test data recorded while gradually varying the laser power.

Thereafter, the optimum recording pulse conditions of the laser power and the pulse width are extracted using the parameters obtained from the characteristic relational expressions (SF4), and data are actually recorded on the first recording layer 11 by the use of the optimum recording pulse conditions (SF5).

When data are recorded on a recording layer, that is, the second recording layer 12, other than the first recording layer 11, as shown in FIG. 12, the reproducing-power laser beam is first irradiated to detect the before-recording reflectance RGa (SG1). Then, it is determined whether a recording medium having reflectance RGa corresponding to the detected reflectance RGa is stored in the data table of the memory unit 127 (SG2). When it is determined in SG2 that the recording medium having the corresponding reflectance RGa is stored in the data table of the memory unit 127, the reference data of the recording medium having the corresponding reflectance RGa are extracted from the data table (SG3), the laser power and the strategy data type of the reference data are determined as the optimum recording pulse conditions (optimum values) of the recording medium as a recording target (SG4), and then the process of SG7 to be described later is performed.

When it is determined in SG2 that the recording medium having the corresponding reflectance RGa is not stored in the data table of the memory unit 127, the reference data of the recording medium having reflectance RGa closest to the detected reflectance are extracted from the data table (SG5), the laser power and the strategy data type of the reference data are subjected to a predetermined operation to calculate the optimum recording pulse conditions (optimum values) of the recording medium as a recording target (SG6).

For example, as shown in FIG. 13, when "20" and "16" are detected as the reflectance RGa and the reflectance RGb of the first recording layer 11, respectively, "25" is detected as the reflectance of the second recording layer 12, and the laser power of "21.8" and the strategy data type of "BC" as the optimum recording pulse conditions of the first recording layer are extracted, the reference data having the medium identification information of "002-XXX" are extracted as the closest reference data from the data table, and the strategy data with the laser power of "22" and the strategy data type of "BB" for the first recording layer 11 (L0) described in the reference data are subjected to a predetermined operation, thereby calculating the optimum recording pulse conditions of the recording medium as the recording target. For example, $21.8 \times (18/22) = 17.8$ is calculated as the laser power of the second recording layer 12.

Thereafter, the test operation including the laser-power-adjusting test recording operation is performed predetermined times at a predetermined recording speed to the test area of the second recording layer 12 by the OPC operation with an adjusting data pattern on the basis of the optimum recording pulse conditions obtained in the process of SG4 or SG6, there reproducing the recorded data, and then it is determined whether the optical recording pulse conditions can be applied at a desired recording speed (SG7).

When it is determined in SG7 that the optimum recording pulse conditions can be applied, the process of SG10 to be described later is performed. When it is determined that the optimum recording pulse conditions cannot be applied, a predetermined recording speed obtained by lowering the recording speed is set or the recording operation is stopped (SG8) and then it is determined whether the recording operation is stopped (SG9). When it is determined that the recording operation is stopped, the process of SG12 to be described later is performed and when the recording speed is set lower, the process of SG7 is performed.

When it is determined in SG7 that the optimum recording pulse conditions can be applied at the desired recording speed, the determination result and the processing details are recorded on the optical disk 10 and are recorded in the memory unit 127 to have a correlation with the medium identification information of the optical disk 10 (SG10).

Then, data are recorded on the optical disk 10 by the use of the optimum recording pulse conditions (SG11). Subsequently, the determination result and the processing details are displayed on the display unit 131 (SG13) and then the data recording process to the second recording layer 12 is ended.

According to the fourth embodiment described above, the reference data corresponding to the laser power and the strategy data type as the recording conditions and the reflectance RGa as the physical characteristic value of the first recording layer 11 and the reflectance RGa of the second recording layer 12 are extracted from the data table, and the recording conditions of the extracted reference data are used as the optimum recording pulse conditions (recording conditions) of the recording medium as the information recording target. Accordingly, even as for an unknown type of recording medium or a recording medium having non-uniform characteristics, it is possible to adjust the optimum recording pulse conditions of the second recording layer 12 for a short time without performing any test recording operation. In addition, even with different recording apparatuses, different recording mediums, and different recording conditions such as a recording speed, it is possible to record information with high quality.

When the reference data corresponding to the laser power and the strategy data type as the recording conditions and the reflectance RGa as the physical characteristic value of the first recording layer 11 and the reflectance RGa of the second recording layer 12 do not exist, the reference data closest to the laser power and the strategy data type as the recording conditions and the reflectance RGa as the physical characteristic value of the first recording layer 11 and the reflectance RGa of the second recording layer 12 are extracted from the data table, and the optimum recording pulse conditions suitable for recording information on the second recording layer 12 of the recording medium as the information recording target are extracted on the basis of the correlation between the recording conditions and the reflectance RGa of the extracted reference data. Accordingly, even as for an unknown type of recording medium or a recording medium having non-uniform characteristics, it is possible to adjust the optimum recording pulse conditions of the second recording layer 12 for a short time without performing any test recording operation. In addition, even with different recording apparatuses, different recording mediums, and different recording conditions such as a recording speed, it is possible to record data with high quality.

According to the fourth embodiment, the optical recording apparatus 100 can easily embody the optical recording method. In addition, the micro CPU device 125 according to the fourth embodiment can easily embody the optical recording method. In addition, the computer program according to the fourth embodiment can easily embody the optical recording apparatus 100 and the optical recording method by the use of any CPU.

In the above-mentioned embodiment, a well-known multi-layered DVD has been used as the optical disk 10. However, even when an HD-DVD is used as the optical disk 10, the same advantages can be obtained through the same processes. When a well-known blue-ray disk is used as the optical disk 10, the optimum recording pulse conditions can be obtained by modifying the processes as described above.

A fifth embodiment of the invention will be described.

The configuration of the fifth embodiment is basically similar to that of the first embodiment. The recording process to the first recording layer 11 in the fifth embodiment is similar to that of the fourth embodiment, but the fifth embodiment is different from the second embodiment, in that when the optimum values cannot be applied in spite of lowering the recording speed, the OPC operation and the operations subsequent thereto are repeated instead of stopping the recording operation and a CPU 125 storing a computer program including a different recording process is used in the fifth embodiment. In the following description, the same elements as the first embodiment and the fourth embodiment are denoted by the same reference numerals.

Figure 14:
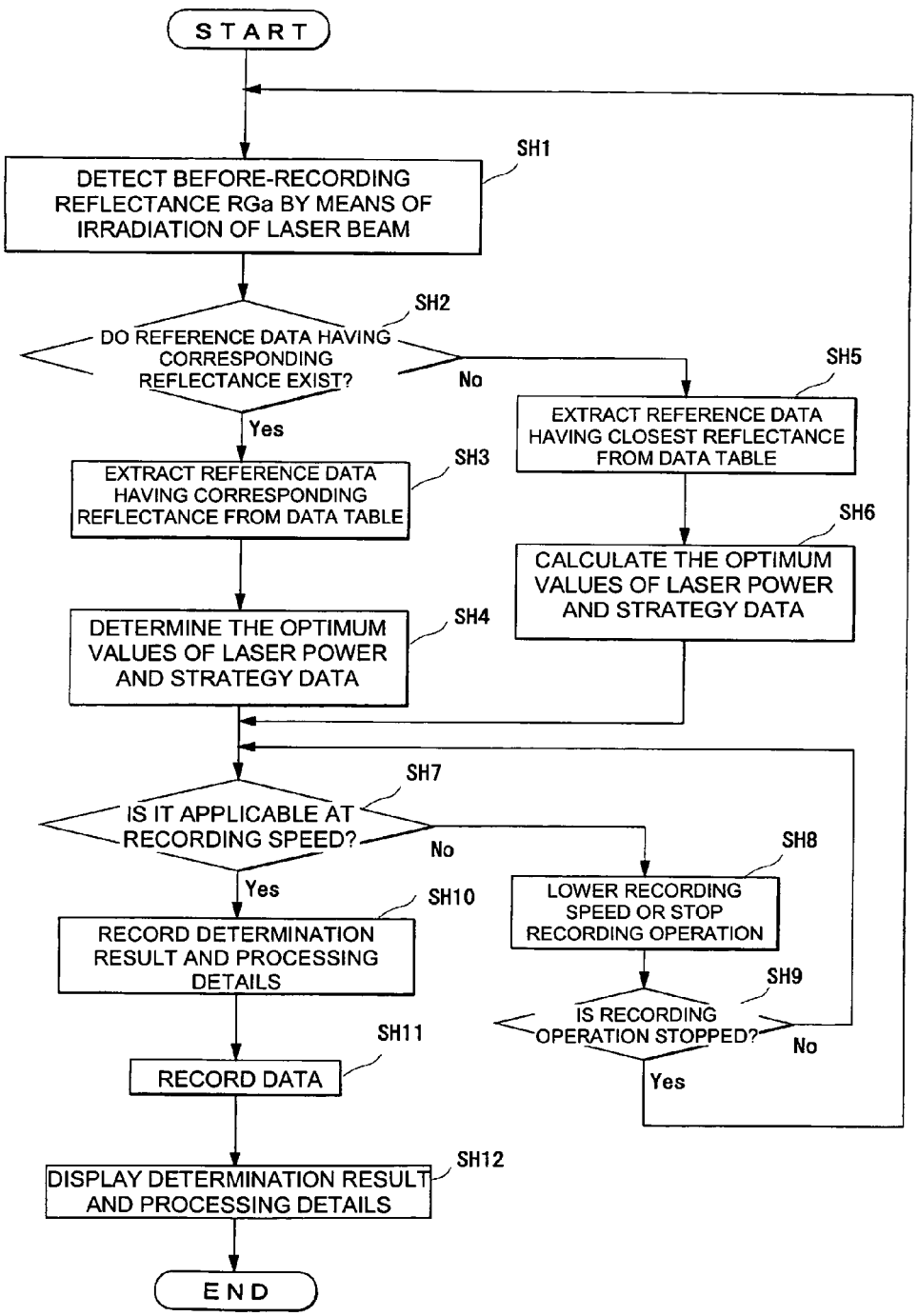
FIG. 14 is a flowchart illustrating a recording process to a second recording layer according to a fifth embodiment of the invention.

FIG. 14 is a flowchart illustrating a recording process to the second recording layer 12 according to the fifth embodiment. A computer program for performing the process is stored in advance in the memory circuit 126 of the CPU 125 and the process is performed by the CPU 125.

In order to record data on the second recording layer 12, as shown in FIG. 14, the reproducing-power laser beam is first irradiated to detect the before-recording reflectance RGa (SH1). Then, it is determined whether a recording medium having reflectance RGa corresponding to the detected reflectance RGa is stored in the data table of the memory unit 127 (SH2). When it is determined in SH2 that the recording medium having the corresponding reflectance RGa is stored in the data table of the memory unit 127, the reference data of the recording medium having the corresponding reflectance RGa are extracted from the data table (SH3), the laser power and the strategy data type of the reference data are determined as the optimum recording pulse conditions (optimum values) of the recording medium as a recording target (SH4), and then the process of SH7 to be described later is performed.

When it is determined in SH2 that the recording medium having the corresponding reflectance RGa is not stored in the data table of the memory unit 127, the reference data of the recording medium having reflectance RGa closest to the detected reflectance are extracted from the data table (SH5), the laser power and the strategy data type of the reference data are subjected to a predetermined operation to calculate the optimum recording pulse conditions (optimum values) of the recording medium as a recording target (SH6).

Thereafter, the test operation including the laser-power-adjusting test recording operation is performed predetermined times at a predetermined recording speed to the test area of the second recording layer 12 by the OPC with an adjusting data pattern on the basis of the optimum recording pulse conditions obtained in the process of SH4 or SH6, thereby reproducing the recorded data, and then it is determined whether the optical recording pulse conditions can be applied at a desired recording speed (SH7).

When it is determined in SH7 that the optimum recording pulse conditions can be applied, the process of SH10 to be described later is performed. When it is determined that the optimum recording pulse conditions cannot be applied, a predetermined recording speed obtained by lowering the recording speed is set or the recording operation is stopped (SH8) and then it is determined whether the recording operation is stopped (SH9). When it is determined that the recording operation is stopped, the process of SH1 is performed and when the recording speed is set lower, the process of SH7 is performed.

When it is determined in SH7 that the optimum recording pulse conditions can be applied at the desired recording speed, the determination result and the processing details are recorded on the optical disk 10 and are all recorded in the memory unit 127 to have a correlation with the medium identification information of the optical disk 10 (SH10).

Then, data are recorded on the optical disk 10 by the use of the optimum recording pulse conditions (SH11). Subsequently, the determination result and the processing details are displayed on the display unit 131 (SH13) and then the data recording process to the second recording layer 12 is ended.

According to the fifth embodiment described above, the reference data corresponding to the laser power and the strategy data type as the recording conditions and the reflectance RGa as the physical characteristic value of the first recording layer 11 and the reflectance RGa of the second recording layer 12 are extracted from the data table, and the recording conditions of the extracted reference data are used as the optimum recording pulse conditions (recording conditions) of the recording medium as the information recording target. Accordingly, even as for an unknown type of recording medium or a recording medium having non-uniform characteristics, it is possible to adjust the optimum recording pulse conditions of the second recording layer 12 for a short time without performing any test recording operation. In addition, even with different recording apparatuses, different recording mediums, and different recording conditions such as a recording speed, it is possible to record information with high quality.

When the reference data corresponding to the laser power and the strategy data type as the recording conditions and the reflectance RGa as the physical characteristic value of the first recording layer 11 and the reflectance RGa of the second recording layer 12 do not exist, the reference data closest to the laser power and the strategy data type as the recording conditions and the reflectance RGa as the physical characteristic value of the first recording layer 11 and the reflectance RGa of the second recording layer 12 are extracted from the data table, and the optimum recording pulse conditions suitable for recording information on the second recording layer 12 of the recording medium as the information recording target are extracted on the basis of the correlation between the recording conditions and the reflectance RGa of the extracted reference data. Accordingly, even as for an unknown type of recording medium or a recording medium having non-uniform characteristics, it is possible to adjust the optimum recording pulse conditions of the second recording layer 12 for a short time without performing any test recording operation. In addition, even with different recording apparatuses, different recording mediums, and different recording conditions such as a recording speed, it is possible to record data with high quality.

According to the fifth embodiment, the optical recording apparatus 100 can easily embody the optical recording method. In addition, the micro CPU device 125 according to the fifth embodiment can easily embody the optical recording method. In addition, the computer program according to the fifth embodiment can easily embody the optical recording apparatus 100 and the optical recording method by the use of any CPU.

In the above-mentioned embodiment, a well-known multilayered DVD has been used as the optical disk 10. However, even when an HD-DVD is used as the optical disk 10, the same advantages can be obtained through the same processes. When a well-known blue-ray disk is used as the optical disk 10, the optimum recording pulse conditions can be obtained by modifying the processes as described above.

The embodiments described above are only specific examples of the invention, and the invention is not limited to the configurations of the embodiments. For example, in the above-mentioned embodiments, the reflectance RGa and RGb of the return beam has been used as the physical characteristic values having a correlation with the recording pulse conditions (recording conditions) of the recording layers 11 and 12 of the optical disk 10, but recording sensitivity, thermal conductivity, or the like in addition to the reflectance may be used as the physical characteristic values if only they have a correlation with the recording pulse conditions (recording conditions) of the recording layers 11 and 12.

In the embodiments, the optimum value of the laser beam irradiated to a different recording layer 12 has been obtained for a short time with reference to the first recording layer 11, but the optimum value of the laser beam irradiated to the different recording layer may be obtained for a short time with reference to a recording layer other than the first recording layer. In the embodiments, the data recording operation has been performed in the order of the first recording layer 11 away from the laser beam irradiating surface and the second recording layer 12 close to the laser beam irradiating surface. However, the invention is not limited to the order, but the data recording operation may be performed from a recording layer other than the first recording layer 11.

What is claimed is:

1. An optical recording method in which when an optical recording apparatus records information by irradiating a laser beam to a recording medium having a plurality of layers including one recording layer and another recording layer, the optical recording apparatus determines a recording condition by recording and reproducing test information with respect to a test area of the one recording layer and records the information on the recording medium by irradiating the laser beam to the recording medium on the basis of the determined recording condition, wherein the optical recording apparatus stores a data table in which reference data of plural types of recording mediums are accumulated where the reference data are obtained by correlating predetermined physical characteristic values having a correlation with recording conditions of at least the one recording layer and the another recording layer with the recording conditions, said method comprising: recording and reproducing the test information with respect to the one recording layer; extracting the recording condition suitable for recording the information on the one recording layer on the basis of a test result of the recording and reproducing; detecting a physical characteristic value of the one recording layer having a correlation with the extracted recording condition; detecting a physical characteristic value of the another recording layer; extracting reference data from the data table associated with a recording medium which corresponds nearly or exactly to the physical characteristic value detected in a first characteristic value detecting step, and the physical characteristic value detected in a second characteristic value detecting step, wherein the extracted reference data is read from the reference data stored in the data table when the recording medium exactly corresponds to at least one of the detected physical characteristic values, and wherein the extracted reference data is derived from the reference data stored in the data table when the recording medium does not exactly correspond to at least one of the detected physical characteristic values; and setting the recording condition defined by the extracted reference data as the recording condition of the recording medium as an information recording target.

2. The optical recording method according to claim 1, wherein the optical recording apparatus records test information on only the one recording layer.

3. The optical recording method according to claim 1, wherein the physical characteristic values detected correspond exactly to a recording medium in the data table.

4. The optical recording method according to claim 1, wherein a value of a predetermined physical quantity of a return beam at a time of irradiating the laser beam to the recording medium is used as a physical characteristic value.

5. The optical recording method according to claim 4, wherein a value of reflectance of the return beam is used as the predetermined physical quantity.

6. The optical recording method according to claim 1, wherein the recording condition of the another recording layer is extracted at least in part by calculating a ratio between the physical characteristic value of the one recording layer and the physical characteristic value of the another recording layer, which are stored in the data table, and calculating the ratio with respect to the recording condition of the one recording layer obtained from the test recording result of the one recording layer of the recording medium as the information recording target.

7. The optical recording method according to claim 1, comprising: another recording layer testing step of recording and reproducing the test information with respect to a test area of the another recording layer by the use of a set recording condition of the another recording layer; and a data recording step of recording data as a recording target when it is determined as a test result that the recording operation can be performed at a designated speed and recording the data as the recording target at a decreased recording speed when it is determined as a test result that it is difficult to perform the recording operation at the designated speed.

8. The optical recording method according to claim 1, comprising: another recording layer testing step of recording and reproducing the test information with respect to a test area of the another recording layer by the use of a set recording condition of the another recording layer; and a data recording step of recording data as a recording target when it is determined as a test result that the recording operation can be performed at a designated speed and stopping recording the data as the recording target when it is determined as a test result that it is difficult to perform the recording operation at the designated speed.

9. The optical recording method according to claim 1, wherein the optical recording apparatus executes another recording layer testing step of recording and reproducing the test information with respect to a test area of the another recording layer by the use of a set recording condition of the another recording layer, and wherein the optical recording apparatus records data as a recording target when it is determined as a test result that the recording operation can be performed at a designated speed and executes again the second characteristic value detecting step, the extraction step, and the recording condition setting step when it is determined as a test result that it is difficult to perform the recording operation at the designated speed.

10. The optical recording method according to claim 3, wherein the optical recording apparatus executes another recording layer testing step of recording and reproducing the test information with respect to a test area of the another recording layer by the use of a set recording condition of the another recording layer, and wherein the optical recording apparatus records data as a recording target when it is determined as a test result that the recording operation can be performed at a designated speed and executes again a second extraction step and a second recording condition setting step when it is determined as a test result that it is difficult to perform the recording operation at the designated speed.

11. The optical recording method according to claim 1, wherein the optical recording apparatus executes another recording layer testing step of recording and reproducing the test information with respect to a test area of the another recording layer by the use of a set recording condition of the another recording layer, and wherein the optical recording apparatus records data as a recording target when it is determined as a test result that the recording operation can be performed at a designated speed and executes again the another recording layer testing step when it is determined as a test result that it is difficult to perform the recording operation at the designated speed.

12. The optical recording method according to claim 7, wherein the optical recording apparatus executes a determination result displaying step of displaying a determination result, which indicates whether the recording operation can be performed at the designated speed on the basis of the test result, on a display.

13. The optical recording method according to claim 1, comprising: an identification information reading step of reading out identification information of the recording medium from the recording medium as the information recording target; and a result recording step of correlating and recording an extracted physical characteristic value, the recording condition obtained from a physical characteristic value, and the identification information of the recording medium with the identification information in any one of a memory of the optical recording apparatus and the recording medium.

14. The optical recording method according to claim 1, wherein when the optical recording apparatus reads out the recording conditions of the recording layers of the recording medium as the information recording target from the data table stored in a memory, the optical recording apparatus determines the recording conditions of the recording layers on the basis of identification information of the recording medium as the information recording target and the physical characteristic values correlated with the recording conditions of the recording layers.

15. An optical recording apparatus which, when recording information by irradiating a laser beam to a recording medium having a plurality of layers including one recording layer and another recording layer, determines a recording condition by recording and reproducing test information with respect to a test area of the one recording layer and records the information on the recording medium by irradiating the laser beam to the recording medium on the basis of the determined recording condition, the optical recording apparatus comprising: a data table in which reference data of plural types of recording mediums are accumulated where the reference data are obtained by correlating predetermined physical characteristic values having a correlation with recording conditions of at least the one recording layer and the another recording layer with the recording conditions; a first recording layer testing unit configured to record and reproduce the test information with respect to the one recording layer; a first recording condition extracting unit configured to extract the recording condition suitable for recording the information on the one recording layer on the basis of a test result of the first recording layer testing unit; a first characteristic value detecting unit configured to detect a physical characteristic value of the one recording layer having a correlation with the extracted recording condition; a second characteristic value detecting unit for detecting a physical characteristic value of the another recording layer; an extraction unit configured to extract reference data from the data table associated with a recording medium which corresponds most closely to the physical characteristic value detected by the first characteristic value detecting unit, and the physical characteristic value detected by the second characteristic value detecting unit, wherein the extraction unit is configured to read the extracted reference data from the reference data stored in the data table when the recording medium exactly corresponds to at least one of the detected physical characteristic values, wherein the extraction unit is further configured to derive the extracted reference data from the reference data stored in the data table when the recording medium does not exactly correspond to at least one of the detected physical characteristic values; and a recording condition determining unit configured to set the recording condition defined by the extracted reference data as the recording condition of the recording medium as an information recording target.

16. The optical recording apparatus according to claim 15, wherein the first recording condition extracting unit is configured to extract a recording condition suitable for recording the information on the another recording layer of the recording medium as the information recording target on the basis of the correlation between the recording condition extracted by the extraction unit and a physical characteristic value.

17. The optical recording apparatus according to claim 15, further comprising a return beam detector configured to acquire a physical characteristic value of a recording layer.

18. The optical recording apparatus according to claim 17, wherein reflectance of the return beam is used as a physical characteristic value.

19. A CPU device of an optical recording apparatus which, when recording information by irradiating a laser beam to a recording medium having a plurality of layers including one recording layer and another recording layer, determines a recording condition by recording and reproducing test information with respect to a test area of the one recording layer and records the information on the recording medium by irradiating the laser beam to the recording medium on the basis of the determined recording condition, the CPU device comprising a memory circuit on which a computer program for executing operation control is recorded, wherein the memory circuit stores a data table in which reference data of plural types of recording mediums are accumulated where the reference data are obtained by correlating predetermined physical characteristic values having a correlation with recording conditions of at least the one recording layer and the another recording layer with the recording conditions, and wherein the memory circuit stores a computer program causing the optical recording apparatus to perform the following steps: recording and reproducing the test information with respect to the one recording layer; extracting the recording condition suitable for recording the information on the one recording layer on the basis of a test result of the recording and reproducing; detecting a physical characteristic value of the one recording layer having a correlation with the extracted recording condition; detecting a physical characteristic value of the another recording layer; extracting reference data from the data table associated with a recording medium which most closely corresponds to the physical characteristic value detected in a first characteristic value detecting step, and the physical characteristic value detected in a second characteristic value detecting step, wherein the extracted reference data is read from the reference data stored in the data table when the recording medium exactly corresponds to at least one of the detected physical characteristic values, and wherein the extracted reference data is derived from the reference data stored in the data table when the recording medium does not exactly correspond to at least one of the detected physical characteristic values; and setting the recording condition of the extracted reference data as the recording condition of the recording medium as the information recording target.

20. The CPU device according to claim 19, further comprising a memory circuit on which a computer program causes the optical recording apparatus to perform the following steps: a second recording condition extracting step of extracting a recording condition suitable for recording the information on the another recording layer of the recording medium as the information recording target on the basis of the correlation between a recording condition and a physical characteristic value in the reference data extracted in the extraction step; and a recording condition determining step of setting the recording condition of the reference data extracted in the second extraction step or the recording condition extracted in the second recording condition extracting step as the recording condition of the recording medium as the information recording target.

21. A computer readable storage device having stored thereon computer program instructions for operating a CPU device of an optical recording apparatus which, when recording information by irradiating a laser beam to a recording medium having a plurality of layers including one recording layer and another recording layer, determines a recording condition by recording and reproducing test information with respect to a test area of the one recording layer and records the information on the recording medium by irradiating the laser beam to the recording medium on the basis of the determined recording condition, wherein the computer program instructions cause an optical recording device to perform the steps of claim 1.

* * * * *